(12) United States Patent
Hsiu et al.

(10) Patent No.: US 8,726,054 B2
(45) Date of Patent: May 13, 2014

(54) CLOUD-BASED ENERGY-SAVING SERVICE SYSTEM AND METHOD

(75) Inventors: Pi-Cheng Hsiu, Kaohsiung (TW);
Chun-Han Lin, New Taipei (TW);
Cheng-Kang Hsieh, Kaohsiung (TW)

(73) Assignee: Academia Sinica, Taipei (TW)

( * ) Notice: Subject to any disclaimer, the term of this patent is extended or adjusted under 35 U.S.C. 154(b) by 254 days.

(21) Appl. No.: 13/468,209

(22) Filed: May 10, 2012

(65) Prior Publication Data
US 2012/0297218 A1    Nov. 22, 2012

Related U.S. Application Data

(60) Provisional application No. 61/487,742, filed on May 19, 2011.

(51) Int. Cl.
*G06F 1/32* (2006.01)
*G06F 1/26* (2006.01)
*G09G 3/36* (2006.01)

(52) U.S. Cl.
USPC ............................ 713/320; 713/321; 345/102

(58) Field of Classification Search
USPC ........................................................ 713/320
See application file for complete search history.

(56) References Cited

U.S. PATENT DOCUMENTS

| | | | | |
|---|---|---|---|---|
| 7,538,762 B2 * | 5/2009 | Fletcher et al. | | 345/211 |
| 7,714,831 B2 * | 5/2010 | Plut | | 345/102 |
| 8,583,945 B2 * | 11/2013 | Tran | | 713/300 |
| 8,587,425 B2 * | 11/2013 | Ferlitsch et al. | | 340/500 |
| 8,621,069 B1 * | 12/2013 | Tompkins | | 709/224 |
| 2006/0238485 A1 * | 10/2006 | Yang | | 345/102 |

* cited by examiner

*Primary Examiner* — Suresh Suryawanshi
(74) *Attorney, Agent, or Firm* — Bacon & Thomas, PLLC

(57) ABSTRACT

A cloud-based energy-saving service system and method are disclosed. The service system and method of this invention use the strong computation capabilities of the cloud computing technology and systems to determine the power consumption policies of the mobile devices and provide the policies to the mobile devices, whereby the mobile devices implement the power consumption policies to save its power consumptions. In one aspect, the invented system and method calculate and determine the backlight level polices for a particular video stream, then provide the policies information to the mobile devices for implementation. The policies information may be provided to the mobile devices independently or along with the video stream. The calculation of the backlight illumination levels may be done in advance or on remand.

26 Claims, 6 Drawing Sheets

CLOUD-BASED ENERGY-SAVING SERVICE SYSTEM AND METHOD

RELATED APPLICATION

This application claims priority from U.S. Provisional Application Ser. No. 61/487,742, filed on May 19, 2011, the entire content of which is incorporated herein by reference.

FIELD OF THE INVENTION

The present invention relates to a cloud-based energy-saving service system and method used in the system, especially to a system and a method that provide energy-saving policies to mobile devices in displaying video streams.

BACKGROUND OF THE INVENTION

The "cloud computing" has become a popular application in the world. Many applications and services using the cloud computing have been developed to make our life more enjoyable. At the same time, the mobile devices have made themselves a necessary tool of everybody's everyday life. To meet the various needs of the users, mobile devices are designed to provide multiple functions, with their hardware components being more powerful and user-friendly. As people are pursuing for more gorgeous human-machine interfaces and complicated application services, next-generation mobile devices will persist in the significant improvements of computation, display and communication capabilities. However, such a trend makes the mobile devices that provide the interactive applications require significant energy consumption, thereby facing a severe challenge in the usage time.

Among the applications that the mobile devices provide, mobile users have been increasingly addicted to multimedia streaming applications and the ability to disseminate videos via social network communities. A 2010 report forecasts that mobile data traffic will double every year in the following few years and that video streaming will account for almost 66 percent of the data traffic by 2014. Such user behavior would lead to a significant increase in the energy consumption of the mobile devices, especially with the users' strong demands for larger, higher-resolution screens. Recent studies on the mobile user behavior indicate that most electric power used in the mobile devices is consumed by the backlight that illuminates the screen of the mobile devices. In order to save energy, so to extend the usage time of the mobile devices, reducing the power consumption of the backlight shall be first considered.

In saving the energy consumed by the backlight, many solutions have been suggested. As the display subsystem needs to stay in active mode for as long as the video stream is displayed, an ideal method to reduce or to minimize the energy consumption of the displaying system is to dim the backlight illumination without adversely impacting the user's visual experience. A video stream comprises a series of image frames. An intuitive way to determine the needed illumination level is to treat a video stream as a collection of image frames and apply a backlight illumination level (hereinafter, the "backlight level") to each image frame. However, in most video applications, the dimmest backlight level may vary significantly across consecutive frames. Changing the backlight illumination level arbitrarily over a number of frames may result in the flickering effects and affect user perception. To resolve this problem, some approaches determine the backlight level for an image frame, taking into considerations the preceding frame's pixel values or illumination values and backlight level. The drawback of this strategy is that switching the backlight level frequently may introduce the inter-frame brightness distortions to the video stream.

In the hardware side, the light source requires reaction time in changing the backlight level. Changing the backlight levels at a high frequency is not acceptable. An approach that groups the image frames of a video stream and determines a common backlight level for each group is proposed by Pasricha et al. See Pasricha et al.: Dynamic Backlight Adaptation for Low-Power Handheld Devices, *IEEE Design & Test of Computers*, 21(5):398-405, 2004. As a result of this solution, the backlight level of a scene may change suddenly, if the frames comprising the scene are partitioned into different groups. To solve this problem, Cheng et al. proposed an approach that quantizes the number of backlight levels to eliminate small backlight fluctuations during a scene. See Cheng et al.: Quality-Based Backlight Optimization for Video Playback on Handheld Devices, *Advances in Multimedia*, 2007. This and other proposed technologies, however, determine the backlight level of the image frames based on the characters of the frames and their adjacent frames, whereby the energy consumption of the full video stream is not considered and verified. In addition, the determination in the backlight levels requires higher calculation capabilities and operation time. In some cases, to calculate the backlight levels of a video stream of 2 minute long at 550-650 kbps would take about 5 minutes if by a mobile device. Needless to say, the power consumed in the computation would not justify the power saved by adjusting the backlight level.

It is therefore necessary to provide a novel energy saving system and method for mobile devices, to provide effective and efficient tools for the mobile device to save its power consumptions.

It is also necessary to provide a system and method that determines the power consumption policies of the mobile devices, when a video stream is being downloaded or displayed.

It is also necessary to provide a system and method to determine the backlight illumination policies of a video stream, so to minimize the total power consumptions of the mobile devices that display the video stream, while the quality of the video stream as displayed is maintained.

It is also necessary to provide a system and method for saving the energy consumption of the mobile devices, while maintaining the operational quality of the mobile devices.

OBJECTIVES OF THE INVENTION

The objective of this invention is to provide a cloud-based energy saving service system and method for mobile devices, to provide effective and efficient tools for the mobile device to save its power consumptions.

Another objective of this invention is to provide a system and method that determines the power consumption policies of the mobile devices, when a video stream is being downloaded or displayed.

Another objective of this invention is to provide a system and method to determine the backlight illumination policies of a video stream, so to minimize the total power consumptions of the mobile devices that display the video stream, while the quality of the video stream as displayed is maintained.

Another objective of this invention is to provide a system and method for saving the energy consumption of the mobile devices, while maintaining the operational quality of the mobile devices.

SUMMARY OF THE INVENTION

According to this invention, a cloud-based energy-saving service system and method are disclosed. The service system and method of this invention use the strong computation capabilities of the cloud computing technology and systems to determine the power consumption policies of the mobile devices and provide the policies to the mobile devices, whereby the mobile devices implement the power consumption policies to save its power consumptions. In one aspect, the invented system and method calculate and determine the backlight level polices for a particular video stream, then provide the policies information to the mobile devices for implementation. The policies information may be provided to the mobile devices independently or along with the video stream. The calculation of the backlight illumination levels may be done in advance or on demand.

Novel methods for the calculation of the backlight illumination levels of the video frames of a video stream are thus provided. In one aspect of this invention, the backlight level policy determination method comprises the steps of: obtaining a video stream consisting of n consecutive video frames; determining the respective minimum backlight illumination levels of all the n video frames of the video stream; determining a first number it of video frames at one end of the video stream in the first direction with a first backlight illumination level $E1$, whereby the power consumption used in the backlight illumination of all video frames of the video stream, if the backlight illumination level of all other $n-i1$ video frames is set to the maximum of their minimum illumination levels, is minimum among the group consisting of the power consumption values calculated for the it video frames and the $i1+1$th video frame following the same method; determining a second number $i2$ of video frames counting from the $i1+1$th video frame of the video stream in the first direction with a second backlight illumination level $E2$, whereby the power consumption used in the backlight illumination of all the $n-i1$ video frames of the video stream, if the backlight illumination level of all other $n-i1-i2$ video frames is set to the maximum of their minimum illumination levels, is minimum among the group consisting of the power consumption values calculated for the $i2$ video frames and the $i2+1$th video frame following the same method; repeating the previous step to obtain third to last backlight illumination levels ($E3$ to $Em$, $m<n$) until the residue number ($n-i1-i2-\ldots-im$) of the video frames is equal to or less than a predetermined value d; determining the backlight illumination level of the last d video frames from the first direction to one value ($Em+1$); and providing the obtained i values and their corresponding backlight lamination levels $E1$ to $Em$ and $Em+1$ as the backlight level policy information.

In the embodiments of the present invention, the backlight illumination levels are preferably divided into a fixed number, e.g., 1-30 levels, with the preference of 10-25 levels. In determining the backlight level policies, a dynamic programming formula may be used recursively, to generate a table of backlight illumination level table for use. Also, in the cloud-based service system of this invention, the mobile device may be equipped with the capability of adjusting the backlight illumination level of its display device in accordance with the backlight illumination levels provided in the backlight level policy information so obtained.

In some embodiments of this invention, the method further includes the step of adjusting the backlight illumination levels before providing the backlight level policy information. The adjustment may include the steps of: Determining difference between two consecutive backlight illumination levels $Ep$ and $Ep+1$ ($1<=p<n$); if the difference value is greater than a threshold, adjust the backlight illumination level with a lower value to a predetermined level. In some embodiments of this invention, the predetermined value is the result of the higher backlight illumination level subtracting the threshold value.

In another aspect of this invention, the backlight level policy determination method comprises the steps of: obtaining a video stream consisting of n consecutive video frames; determining the respective minimum backlight illumination levels of all the n video frames of the video stream; selecting a video frame with the highest minimum backlight illumination level from the video frames; determining a first pair of numbers $i1$ and $j1$ of the video frames, $1<j1\leq h\leq i1\leq n$ and $i1-j1\geq d$, so that the sum of power consumption used in the backlight illumination of all video frames of the video stream, if the backlight illumination level of the jth to ith frames is set to the maximum among their critical illumination levels and the backlight illumination value of all other frames is set to their respective critical levels, is the minimum among the group consisted of the sum of their power consumption values, with $j1$ and $i1$ being any of 1 to n other than $j1$ and $i1$, following the same method; recording backlight illumination level for frames $j1$ to $i1$ as h; repeating the previous two steps to determine second and following pairs of numbers i and j for the first to $j-1$th video frames and the $i+1$th to nth video frames and backlight illumination levels for frames j to i, until all the video frames are processed; and providing the backlight illumination levels as determined as backlight illumination policy for the video stream.

These and other objectives and advantages of the present invention will be clearly understood from the detailed descriptions by referring to the following drawings.

DETAILED DESCRIPTION OF THE INVENTION

Although it is not intended to limit the scope of the present invention to any theory, it has been found by the inventors that the strong computation capabilities of the cloud-based computing technologies and systems are a useful tool in determining the power consumption policies of the mobile devices, in order to obtain the optimal power consumption policies of their components without the additional, complicated and time and energy consuming calculations of the mobile devices. It is also discovered that an energy-saving policy that aims at the minimum total power consumption of the backlight illumination will help the mobile device to effectively extend their usage time. The present invention thus discloses a cloud-based energy-saving service system and method to determine the power consumption policies of the mobile devices, whereby the mobile devices won't need to consume additional energy and operation times, with the power consumed in the mobile devices dramatically reduced.

Figure 1:
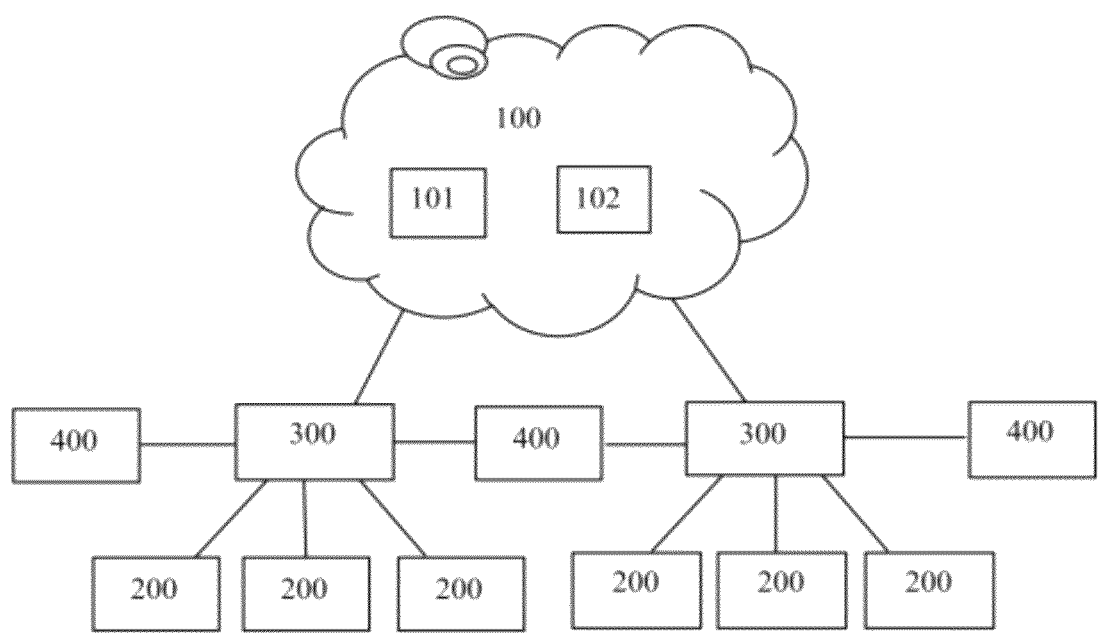
FIG. 1 illustrates the systematic diagram of the cloud-based energy-saving service system of the present invention.

FIG. 1 illustrates the systematic diagram of the cloud-based energy-saving service system of the present invention. As shown in this figure, the invented cloud-based energy-saving service system includes a cloud site 100 and a plurality of mobile device sites 200, 200. In addition, a plurality of system operators 300, 300 and a plurality of stream servers 400, 400 are shown. The cloud site 100 is provided with at least one backlight server 101 and possibly an energy saving server 102. Each mobile device site 200, 200 is connected to at least one system operator 300, 300, which is connectable to the cloud site 100 and the streaming servers 400, 400.

Figure 2:
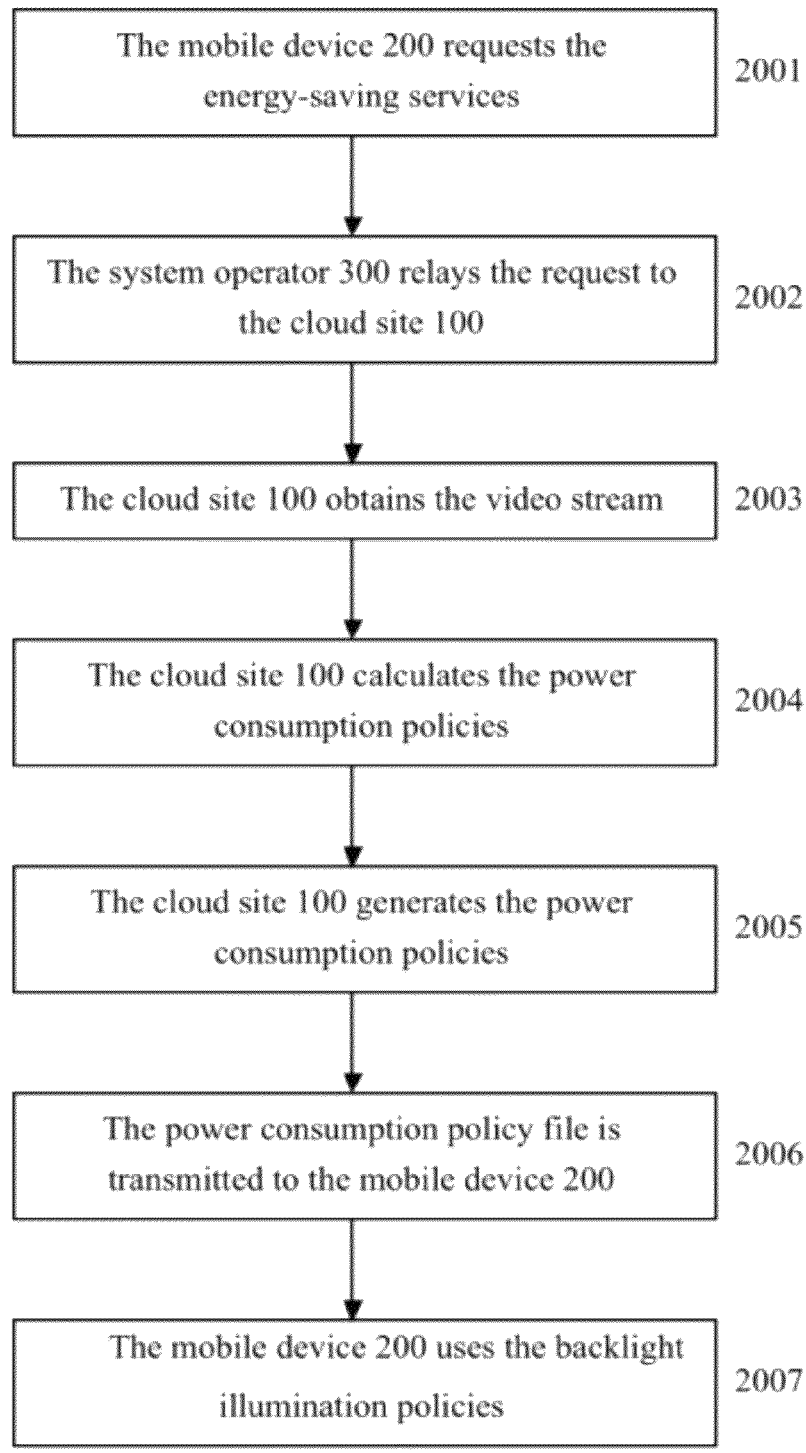
FIG. 2 illustrates the systematic flowchart of the cloud-based energy-saving service method of this invention.

According to the present invention, when a mobile device 200 requests the energy-saving services from the cloud site 100, the cloud site 100 obtains the video stream that the mobile device 200 requests for display and determines the power consumption policies of the backlight for the mobile device 200 in receiving and displaying the requested video stream, then provides the power consumption policy information so obtained to the mobile device 200, which implements the policies to save its energy consumption. FIG. 2 illustrates the systematic flowchart of the cloud-based energy-saving service method of this invention. As shown in this figure, at step 2001 the mobile device 200 requests the energy-saving services from the cloud site 100 by connecting its corresponding system operator 300. At 2002 the system operator 300 relays the request to the cloud site 100. At 2003 the cloud site 100 obtains the IP address of the requested video stream and connects the video stream server 400 to obtain the video stream. After the video stream is obtained, at 2004 the cloud site 100 instructs the backlight server 101 to calculate the backlight illumination policies of the video stream. At 2005 the cloud site 100 generates a power consumption policy file to include the backlight illumination policies. At 2006 the power consumption policy file is transmitted to the mobile device 200. At 2007 the mobile device 200 connects the stream server 400 via the system operator 300 and starts to download the requested video stream and display it, using the he backlight illumination policies.

The cloud site 100 is responsible for determining the backlight level policies, while exempting the mobile devices from the computation overheads in the policies. The obtained power consumption policies are stored in a power consumption policy file, preferably a text file, in a space-efficient format and associated with the corresponding video stream, preferably with its URL linkage information. In the embodiments of this invention, the size of a power consumption policy file for a 15 MB video stream (with a bit rate of 550-650 kbps) is usually less than 1 KB; it can be transmitted in no time when the wireless bandwidth is sufficient for video streaming.

Figure 3:
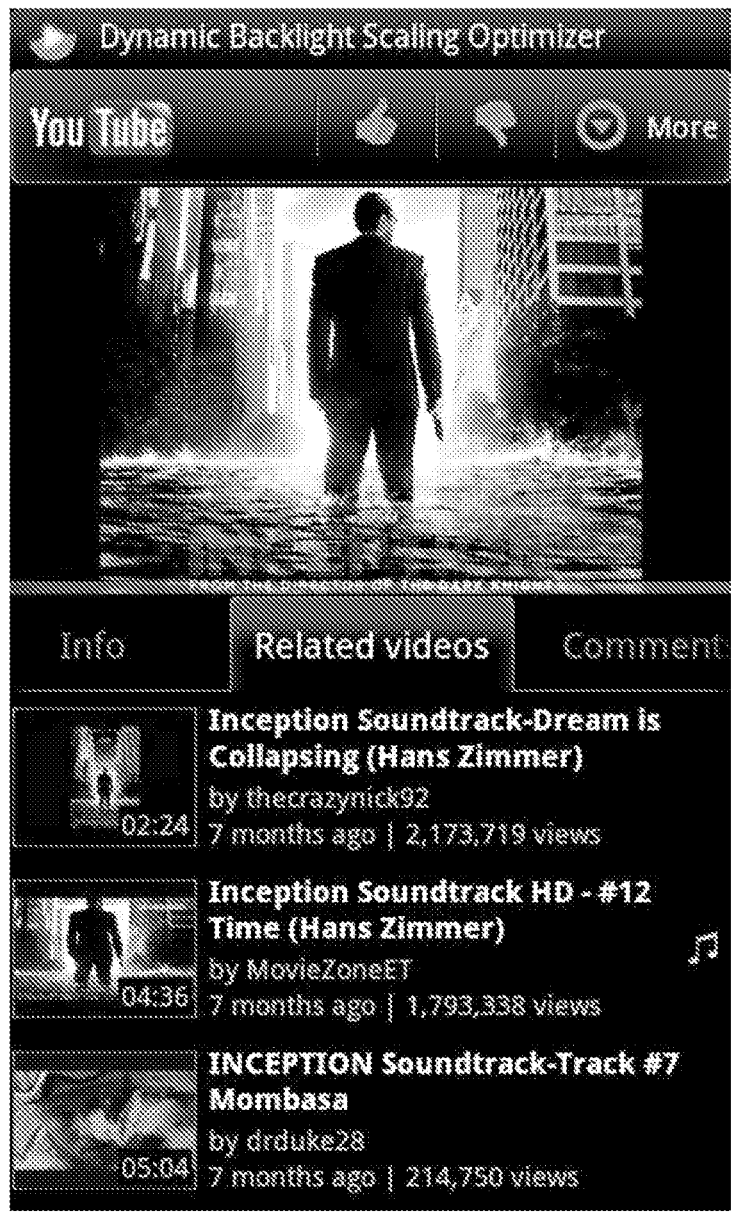
FIG. 3 shows an example of the user interface for the on-demand backlight level policy determination services of one embodiment of this invention.

It would be ideal if all the video streams stored with the streaming servers 400, 400 may be analyzed in advance. However, by doing so the calculation would be tremendously timing consuming and a huge storage space is required. In running the energy-saving services, it is possible for the cloud site 100 to analyze the most popular video streams in the stream server 400, leaving the remains to be analyzed on demand. The on-demand policy is inspired by the observations in that most video streams at a streaming server, especially the community websites, are not interesting to people and that the popular videos vary from time to time. FIG. 3 shows an example of the user interface for the on-demand backlight level policy determination services of one embodiment of this invention, which runs on the Android mobile devices.

When a mobile device 200 requests the energy-saving services from the cloud site 100, the requested video stream's URL linkage information is provided to the cloud site 100, which determines if the video stream's power consumption policy file already exists in the cloud site 100. If not, the cloud site 100 uses its backlight server 101 to analyze the video stream, to generate the backlight level policies and include them into a power consumption policy file. The power consumption file is then provided to the mobile device 200 for implementation. If the power consumption policy file already exists, the cloud site 100 simply obtains the file and provide it to the mobile device 200 for execution.

In the embodiments of this invention, the power consumption policy file is a file independent to the video stream, similar to a subtitle file to the video stream. Such a design makes the power consumption policy file executable in different application programs used in the mobile device 200 and in the stream servers 400, 400. Therefore, the mobile devices 200, 200 benefit from the energy-saving service of the present invention without changing their user preferences. Of course, it is also possible to embed the power consumption policy file into the video stream for execution.

The mobile devices 200, 200 are embedded with a program to execute the power consumption policy file. In a preferred embodiment, the mobile device 200 simply executes the backlight illumination policies and varies the backlight levels during the display of the video stream. In other embodiments, the mobile device 200 executes the backlight illumination policies and other power consumption policies. For example, if CPU power consumption policies are provided, the mobile device 200 omits the video frames that need not to be displayed, while maintaining the video frames preceding the omitted frames on screen. If communication components power consumption policies are provided, the mobile device 200 omits the video frames that need not to be received, to save the working time of the communication components and the CPU.

Although in the backlight server 101 of the present invention, any policy to dynamically adjust the backlight illumination levels may be used, in this invention novel methods for the calculation of the backlight illumination levels of the video frames of a video stream are additionally provided. In the followings, particular embodiments in the automatic determination of the backlight illumination policies will be described. It is appreciated that the following embodiments are given in order to explain possible approaches in establishing the backlight illumination policies. They are not given to limit the scope of this invention.

Embodiment I

Figure 4:
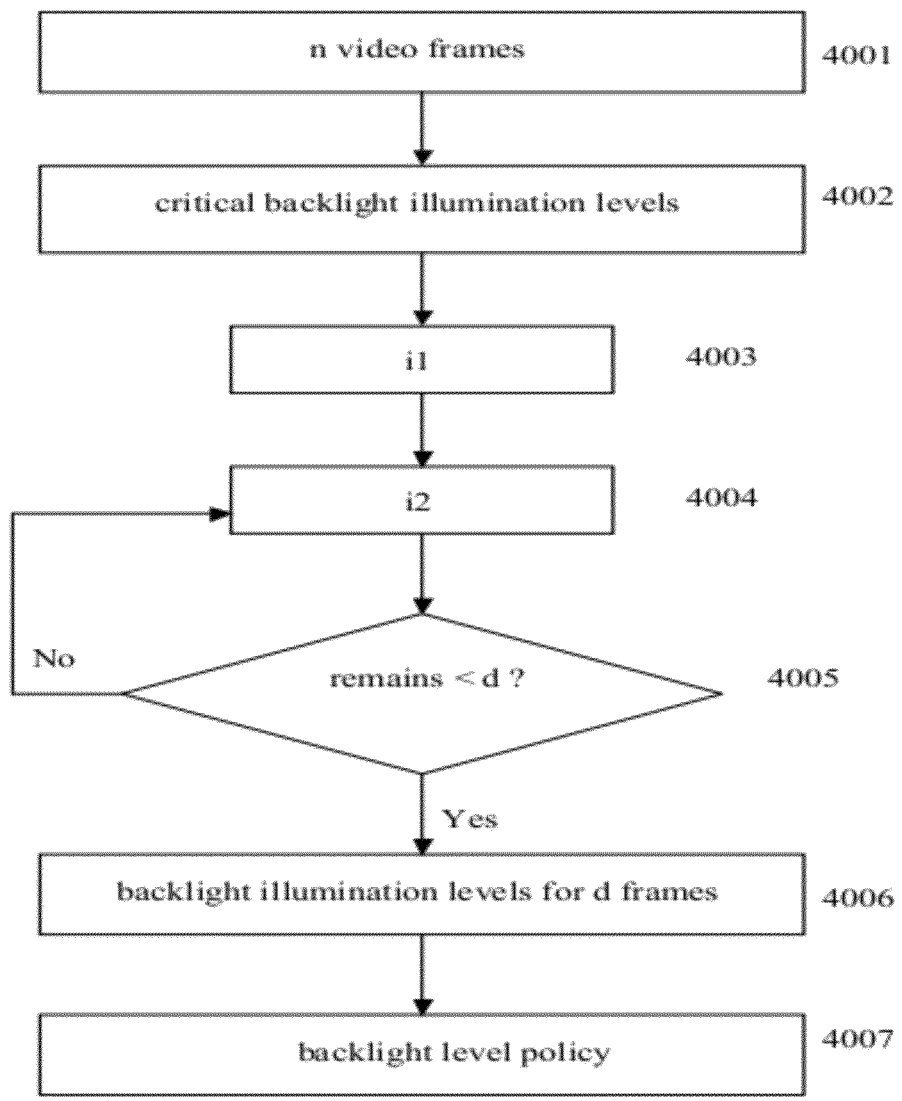
FIG. 4 is flowchart for the dynamic backlight illumination policy determination method of one embodiment of this invention.

FIG. 4 is a flowchart for the dynamic backlight illumination level determination method of the first embodiment of this invention. As shown in this figure, the backlight level policy determination method comprises the following steps: At 4001 the backlight server 101 obtains a video stream consisted of n consecutive video frames. At 4002 the backlight server 101 determines the respective minimum, or critical, backlight illumination levels of all the n video frames of the video stream. In doing so, the least backlight illumination levels required in displaying the video stream are determined.

Any image compensation technique may be used to compute a video frame's critical backlight level, in the determination of the minimum or critical backlight illumination levels. However, to avoid the distortion in the displayed images, an image distortion metric is preferably employed. Among the image distortion metric policies available in the industry, the structural similarity (SSIM) index is a good example and is useful as the image distortion metric of this embodiment. The resultant SSIM index is a decimal value between −1 and 1, where the value 1 is only reachable in the case of two identical video frames. Given a video stream, the critical backlight level of each image frame is computed with respect to a specified SSIM index. The minimum backlight illumination levels are determined in accordance with the critical backlight levels. In the embodiments of the present invention, the backlight illumination levels are preferably divided into a fixed number, e.g., 1-30 levels, with the preference of 10-25 levels. In one preferred embodiment 20 backlight levels are used.

At 4003 the backlight server 101 determines a first number i1 of video frames at one end, preferably from the last frame, of the video stream in the first direction, e.g., backwards, with a first backlight illumination level E1, whereby the sum of power consumption used in the backlight illumination of all video frames of the video stream, if the backlight illumination level of all other n−i1 video frames is set to the maximum among their minimum illumination levels, is minimum among the group consisted of the sum of power consumption values calculated by setting the i1 value to any of 1 to i1−1 and i1+1 following the same method.

In doing so, the first backlight illumination level E1 may be the maximum of the minimum backlight illumination level determined and assigned to the video frames in the group of frames 1 to i1, counting from the last frame backwardly. In one embodiment of this invention, the total power consumption of the video stream when displayed is calculated by setting the i numbers from 1 to n. A table of n total power consumption values is thus established. In establishing the table, a dynamic programming formula may be used recursively. Although the calculation of the dynamic programming formula is computing intensive, the strong computation power of the backlight server 101 would overcome this difficulty. In the determination of the i numbers and their corresponding backlight illumination levels E, the total power consumption values in the table may be used.

At 4004 the backlight server 101 determines a second number i2 of video frames counting from the i1+1th video frame of the video stream in the first direction, e.g. backwardly, with a second backlight illumination level E2, whereby the sum of power consumption used in the backlight illumination of all the n−i1 video frames of the video stream, if the backlight illumination level of all other n−i1−i2 video frames is set to the maximum among their minimum illumination levels, is minimum among the group consisted of the sum of power consumption values calculated by setting i2 to any of 1 to i2−1 and i2+1 following the same method. At 4005 the backlight server 101 determines whether the residue number of the video frames is equal to or less than a predetermined value d. The d number may be any natural number, representing the minimum interval required in changing the backlight illumination levels. For a video stream displayed at the rate of 30 frames per second, the d value may be any number between 1 and n (the number of frames in the video stream), preferably 10. If the result is negative, the step returns to 4004, otherwise the backlight server 101 determines the backlight illumination level of the last d video frames from the first direction to one value (Em+1) at 4006. Again, the value may be the maximum of the minimum backlight illumination level of the d video frames. Finally, at 4007 the backlight server 101 provides the obtained i values and their corresponding backlight lamination levels E1 to Em and Em+1 as the backlight level policy information.

Embodiment II

Figure 5:
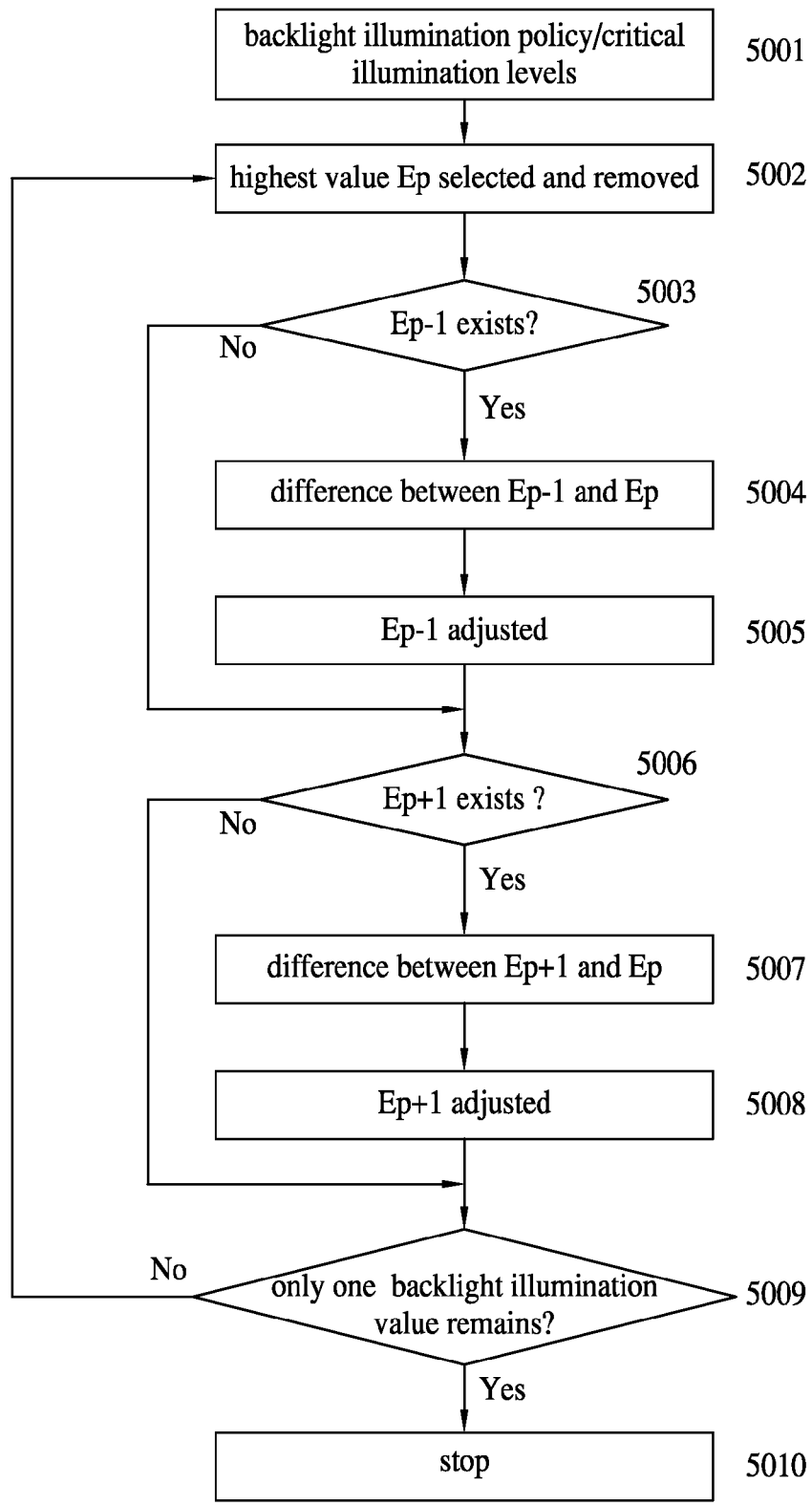
FIG. 5 shows the flowchart of the backlight illumination policy adjustment method of one embodiment of this invention.

To avoid video distortion due to the sudden change of the backlight illumination levels, the backlight illumination policies obtained from the above-described process may be further adjusted. FIG. 5 shows the flowchart of the backlight illumination policy adjustment method of one embodiment of this invention. As shown in this figure, at 5001 a backlight illumination policy file including a series of backlight illumination values E assigned to all frames of a video stream is obtained. Note that this method may be used in adjusting the critical backlight illumination levels of a video stream. In such an application, the data obtained in this step 5001 are the critical backlight illumination levels of the video stream. In the following description, the term "backlight values" shall mean both the backlight values determined in the process of FIG. 4 and the critical backlight illumination levels. In 5002 the backlight value with the highest value Ep is selected and removed from the series of backlight illumination values. At 5003 determine if the p31 1th backlight value Ep−1 exists in the series. If not, the p−1th backlight value is not changed. Otherwise, the p−1th backlight value is compared with Ep at 5004. If the difference between Ep−1 and Ep is greater than a threshold r, the value of Ep−1 is adjusted at 5005. Otherwise, it is not changed. In the preferred embodiment of this invention, when adjusting the Ep−1 value, the value of Ep/(1+r) is used to replace the value of Ep−1. Of course, other value that would moderate the change in the backlight value may be used. In step 5006, determine if the p+1th backlight value Ep+1 exists in the series. If not, the p+1th backlight value is not changed. Otherwise, the p+1th backlight value is compared with Ep at 5007. If the difference between Ep+1 and Ep is greater than the threshold r, the value of Ep+1 is adjusted at 5008. Otherwise, it is not changed. In the preferred embodiment of this invention, when adjusting the Ep+1 value, the value of Ep(1−r) is used to replace the value of Ep+1. Of course, other value that would moderate the change in the backlight value may be used. At 5009 determine whether the backlight illumination values in the series contains only one value (the case where only one member of the series is left and the case where all the members left in the series have the same value). If yes, the step stops at 5010; otherwise, the step goes back to 5002.

By adjusting the backlight illumination values image distortions due to sudden change in the backlight value may be avoided.

Embodiment III

Figure 6:
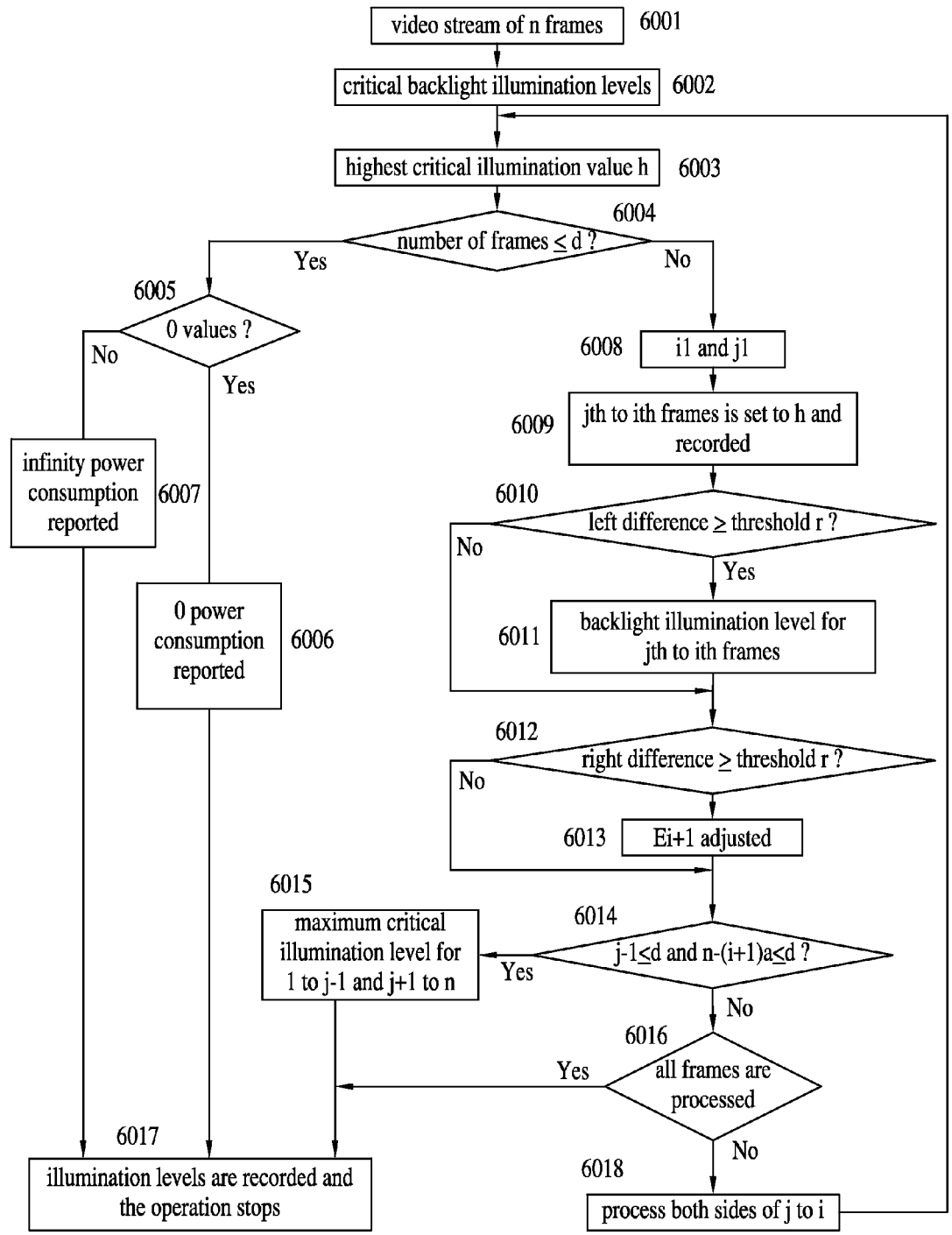
FIG. 6 is flowchart for the dynamic backlight illumination policy determination method of another embodiment of this invention.

In this embodiment, a backlight illumination policy determination method that avoids video distortions due to sudden changes in the backlight illumination levels and fits in with hardware/software limitation in the capabilities of changing frequency of the backlight illumination levels, is provided. FIG. 6 shows the flowchart of the backlight illumination policy adjustment method of this third embodiment of this invention. As shown in this figure, the backlight level policy determination method comprises the following steps: At 6001 the backlight server 101 obtains a video stream consisted of n consecutive video frames, including frames 1 to n. At 6002 the backlight server 101 determines the respective critical backlight illumination levels of all the n video frames of the video stream. In doing so, the least backlight illumination levels required in displaying the video stream are determined.

At 6003 the backlight server 101 determines a video frame with the highest critical illumination value h for frame h from video frames 1 to n. At 6004 the backlight server 101 determines whether the number of the frames is equal to or less than a predetermined value d. If the result is positive, at 6005 the backlight server determines whether the backlight illumination values contain 0 values. If yes, 0 power consumption is reported at 6006; otherwise, the infinity power consumption is reported at 6007. In either case, the operation goes to 6017, at which the resulted illumination levels are recorded as the backlight illumination policy. The operation stops. If the result of step 6004 is negative, at 6008, the backlight server 101 determines a first pair of numbers i1 and j1 of the video frames, $1 \leq j1 \leq h \leq i1 \leq n$ and $i1-j1 \geq d$, so that the sum of power consumption used in the backlight illumination of all video frames of the video stream, if the backlight illumination level of the jth to ith frames is set to the maximum among their critical illumination levels and the backlight illumination value of all other frames is set to their respective critical levels, is minimum among the group consisted of the sum of power consumption values with j1 and i1 being any of 1 to n other than j1 and i1, following the same method.

In doing so, in one example of this invention, the total power consumption of the video stream when displayed is calculated by setting the i and j numbers from 1 to n. A table of n total power consumption values is thus established. In establishing the table, a dynamic programming formula may also be used recursively. Although the calculation of the dynamic programming formula is computing intensive, the strong computation power of the backlight server 101 would overcome this difficulty. In the determination of the i and j numbers and their corresponding backlight illumination levels, the total power consumption values in the table may be used.

In addition, in order to compromise with the hardware/software limitations in the capabilities of changing frequency of the backlight illumination levels, in generating the table of the sum of power consumption, the d value in Embodiment I may be used to select the j and i numbers. In other words, the j and i numbers are not selected from all the first to nth numbers but are selected at the interval of d, which is preferably 10, if the backlight illumination level is divided into 20-25 levels.

At step 6009 the backlight illumination level of the jth to ith frames is set to h and recorded. At 6010 the backlight server 101 determines if the difference between the illumination level of h and the critical illumination level of the j−1th frame is greater than a threshold r. If yes, the critical illumination level of the j−1th frame is changed to a predetermined value, e.g., $h/(1+r)$, at step 6011. Otherwise, the level is not changed. At 6012 the backlight server 101 determines if the difference between the illumination level of h and the critical illumination level of the i+1th frame is greater than a threshold r. If yes, the critical illumination level of the i+1th frame is changed to a predetermined value, e.g., $h(1-r)$, at step 6013. Otherwise, the level is not changed. At 6014 the backlight server 101 determines if the number of j−1 and the number of n−(i+1) are respective less than d. If yes, the backlight illumination level of the first to j−1th frames, or the i+1th to nth frames, is set to the highest critical illumination level among the frames and recorded at 6015. Otherwise, at 6016 the backlight server determines if all frames have been processed. If yes, at 6017 the resulted illumination levels are recorded as the backlight illumination policy and the operation stops; Otherwise, the first to j−1th frames and the i+1th to nth frames are processed, respectively at 6018. The step returns to 6003. Following this, the second and following pairs of I and j numbers are determined, until all the video frames are all processed.

In this embodiment, the d value is used to fit in with hardware/software limitation in the capabilities of changing frequency of the backlight illumination levels. The d number may be any natural number, representing the minimum interval required in changing the backlight illumination levels. For a video stream displayed at the rate of 30 frames per second, the d value may be any number between 1 and n (the number of frames in the video stream), preferably 10.

By adjusting the backlight illumination values, image distortions due to sudden change in the backlight value may be avoided and hardware/software limitation in the capabilities of changing frequency of the backlight illumination levels may be fitted.

To evaluate the effects of the invention, an experimental website is implemented at the Taiwanese system operator, Chunghwa Telecom's hicloud at http://hicloud.hinet.net. A power consumption policy execution program is installed in an Android smart phone in the brand name of HTC Desire, equipped with a 3.7-inch Super LCD display subsystem illuminated by a cold cathode fluorescent lamp, as well as installed in a tablet in the brand name of Apple iPad, equipped with a 9.7-inch Multi-Touch IPS display subsystem illuminated by a light-emitting diode. When executing the backlight illumination policy files and displaying their corresponding video streams, 11-20% energy savings are noted for the whole HTC Desire system (or 18-31% for the display subsystem), while 31-41% energy savings are noted for the whole Apple iPad system (or 39-51% for the display subsystem), when browsing the video streams on YouTube, while users were not conscious of the dynamic variations in the backlight levels. The efficacy of the invented system and method is more evident when a video stream contains a large variety of scenes, or when the energy consumption increases more significantly with the backlight level.

Two HTC Desire smart phones are fully recharged and display the same set of videos collected from YouTube, with one of the smart phones executing the backlight illumination policies calculated according to this invention. The one not in execution of the backlight illumination policies exhausts its power after 3 hours and 31 minutes, while the one executing the backlight illumination policies did not exhaust its power until after 4 hours and 13 minutes. The mobile device using the backlight illumination policies has a working time 42 minutes longer.

What is claimed is:

1. A cloud-based energy-saving service system, comprising
    a receiving port to receive the request of energy-saving services and to receive a video stream in response to the energy-saving services request;
    a cloud-based computing center to determine the power consumption policies of a mobile device to receive and/or display the video stream; and
    a providing port to provide information including the resulted power consumption policies to the requester of the energy-saving services;
    wherein the resulted power consumption policies include the backlight level policies of the mobile device in displaying the video stream.

2. The system according to claim 1, wherein the power consumption policies information is provided to the mobile device along with the video stream.

3. The system according to claim 1, wherein the cloud-based computing center stores power consumption policies for particular video streams corresponding to particular mobile devices.

4. The system according to claim 1, wherein the computing center determines the backlight level policies of the video stream consisting of n consecutive video frames by the following steps:
- determining the respective minimum backlight illumination levels of all the n video frames of the video stream;
- determining a first number i1 of video frames at one end of the video stream in the first direction with a first backlight illumination level E1, whereby the power consumption used in the backlight illumination of all video frames of the video stream, if the backlight illumination level of all other n−i1 video frames is set to the maximum of their minimum illumination levels, is minimum among the group consisting of the power consumption values calculated for the i1 video frames and the i1+1th video frame following the same method;
- determining a second number i2 of video frames counting from the i1+1th video frame of the video stream in the first direction with a second backlight illumination level E2, whereby the power consumption used in the backlight illumination of all the n−i1 video frames of the video stream, if the backlight illumination level of all other n−i1−i2 video frames is set to the maximum of their minimum illumination levels, is minimum among the group consisting of the power consumption values calculated for the i2 video frames and the i2+1th video frame following the same method;
- repeating the previous step to obtain third to last backlight illumination levels (E3 to Em, m<n) until the residue number (n−i1−i2− . . . −im) of the video frames is equal to or less than a predetermined value d;
- determining the backlight illumination level of the last d video frames from the first direction to one value (Em+1); and
- providing the obtained i values and their corresponding backlight lamination levels E1 to Em and Em+1 as the backlight level policy information.

5. The system according to claim 4, wherein the backlight illumination levels are divided into a fixed number of 10-25.

6. The system according to claim 4, wherein a dynamic programming formula is used recursively, to generate a table of backlight illumination level table for use.

7. The system according to claim 4, wherein determination in the backlight level policies further comprises the following steps before providing the i values:
- determining difference between two consecutive backlight illumination levels Ep and Ep+1 (1<=p<n); and
- if the difference value is greater than a threshold r, adjusting the backlight illumination level with a lower value to a predetermined level.

8. The system according to claim 7, wherein the predetermined level is the result of Ep/(1+r), if Ep+1 is greater than Ep and is Ep*(1−r), if Ep is greater than Ep+1.

9. The system according to claim 1, wherein the computing center determines the backlight level policies of the video stream consisting of n consecutive video frames by the following steps:
- a. determining the respective minimum backlight illumination levels of all the n video frames of the video stream;
- b. selecting a video frame with the highest minimum backlight illumination level from the video frames;
- c. determining a first pair of numbers i1 and j1 of the video frames, $1<j1 \leq h \leq i1 \leq n$ and $i1-j1 \geq d$ wherein d is a constant, so that the sum of power consumption used in the backlight illumination of all video frames of the video stream, if the backlight illumination level of the jth to ith frames is set to the maximum among their critical illumination levels and the backlight illumination value of all other frames is set to their respective critical levels, is the minimum among the group consisted of the sum of their power consumption values, with j1 and i1 being any of 1 to n other than j1 and i1, following the same method;
- d. recording backlight illumination level for frames j1 to i1 as h;
- e. repeating steps c and d to determine second and following pairs of numbers i and j for the first to j−1th video frames and the i+1th to nth video frames and backlight illumination levels for frames j to i, until all the video frames are processed; and
- f. providing the backlight illumination levels as determined as backlight illumination policy for the video stream.

10. The system according to claim 9, wherein the backlight illumination levels are divided into a fixed number of 10-25.

11. The system according to claim 9, further comprising the following steps after step d:
- d1. adjusting minimum backlight illumination level for video frame j−1 to a predetermined value, if difference between backlight illumination level h and minimum backlight illumination level for frame j−1 is greater than or equal to a threshold value;
- d2. adjusting minimum backlight illumination level for video frame i+1 to a predetermined value, if difference between backlight illumination level h and minimum backlight illumination level for frame i+1 is greater than or equal to a threshold value.

12. The system according to claim 11, wherein the predetermined value is the result of h/(1+r) for frame j−1 and is h*(1−r) for video frame i+1.

13. The system according to claim 9, wherein the d value is 10, if the video stream is to be display at 30 frames per second.

14. The system according to claim 9, wherein a dynamic programming formula is used recursively, to generate a table of backlight illumination level table for use.

15. A method for the determination of the backlight illumination levels of the video frames of a video stream consisting of n consecutive video frames to be displayed in a mobile device, comprising the steps of:
- determining the respective minimum backlight illumination levels of all the n video frames of the video stream;
- determining a first number i1 of video frames at one end of the video stream in the first direction with a first backlight illumination level E1, whereby the power consumption used in the backlight illumination of all video frames of the video stream, if the backlight illumination level of all other n−i1 video frames is set to the maximum of their minimum illumination levels, is minimum among the group consisting of the power consumption values calculated for the i1 and the i1+1th video frames following the same method;
- determining a second number i2 of video frames counting from the i1+1th video frame of the video stream in the first direction with a second backlight illumination level E2, whereby the power consumption used in the backlight illumination of all the n−i1 video frames of the video stream, if the backlight illumination level of all other n−i1−i2 video frames is set to the maximum of their minimum illumination levels, is minimum among the group consisting of the power consumption values calculated for the i2 and the i2+1th video frames following the same method;

repeating the previous step to obtain third to last backlight illumination levels (E3 to Em, m<n) until the residue number (n−i1−i2− . . . −im) of the video frames is equal to or less than a predetermined value d;

determining the backlight illumination level of the last d video frames from the first direction to one value (Em+1); and providing the obtained i values and their corresponding backlight lamination levels E1 to Em and Em+1 as the backlight level policy information.

16. The method according to claim 15, wherein the backlight illumination levels are divided into a fixed number of 10-25.

17. The method according to claim 15, wherein when determining the i numbers, a dynamic programming formula is used recursively, to generate a table of backlight illumination level table for use.

18. The method according to claim 15, further comprising the step of adjusting backlight illumination level of a display device in accordance with the backlight level policy information so obtained.

19. The method according to claim 15, further comprising the following steps before providing the i values:

determining difference between two consecutive backlight illumination levels Ep and Ep+1 (1<=p<n); and if the difference value is greater than a threshold r, adjusting the backlight illumination level with a lower value to a predetermined level.

20. The method according to claim 15, wherein the predetermined level is the result of Ep/(1+r), if Ep+1 is greater than Ep and is Ep*(1−r), if Ep is greater than Ep+1.

21. A method for the determination of the backlight illumination levels of the video frames of a video stream consisting of n consecutive video frames to be displayed in a mobile device, comprising the steps of:

a. determining the respective minimum backlight illumination levels of all the n video frames of the video stream;

b. selecting a video frame with the highest minimum backlight illumination level from the video frames;

c. determining a first pair of numbers i1 and j1 of the video frames, 1<j1≤h≤i1≤n and i1−j1≥d wherein d is a constant, so that the sum of power consumption used in the backlight illumination of all video frames of the video stream, if the backlight illumination level of the jth to ith frames is set to the maximum among their critical illumination levels and the backlight illumination value of all other frames is set to their respective critical levels, is the minimum among the group consisted of the sum of their power consumption values, with j1 and i1 being any of 1 to n other than j1 and i1, following the same method;

d. recording backlight illumination level for frames j1 to i1 as h;

e. repeating steps c and d to determine second and following pairs of numbers i and j for the first to j−1th video frames and the i+1th to nth video frames and backlight illumination levels for frames j to i, until all the video frames are processed; and f. providing the backlight illumination levels as determined as backlight illumination policy for the video stream.

22. The method according to claim 21, wherein the backlight illumination levels are divided into a fixed number of 10-25.

23. The method according to claim 21, further comprising the following steps after step d:

d1. adjusting minimum backlight illumination level for video frame j−1 to a predetermined value, if difference between backlight illumination level h and minimum backlight illumination level for frame j−1 is greater than or equal to a threshold value;

d2. adjusting minimum backlight illumination level for video frame i+1 to a predetermined value, if difference between backlight illumination level h and minimum backlight illumination level for frame i+1 is greater than or equal to a threshold value.

24. The method according to claim 23, wherein the predetermined value is the result of h/(1+r) for frame j−1 and is h*(1−r) for video frame i+1.

25. The method according to claim 21, wherein the d value is 10, if the video stream is to be display at 30 frames per second.

26. The method according to claim 21, wherein when determining the i and j numbers, a dynamic programming formula is used recursively, to generate a table of backlight illumination level table for use.

* * * * *